United States Patent
Kawamitsu

(10) Patent No.: US 10,658,002 B2
(45) Date of Patent: May 19, 2020

(54) MAGNETIC DISK DEVICE, CONTROL DEVICE, AND REGULATOR DEVICE

(71) Applicants: Kabushiki Kaisha Toshiba, Minato-ku, Tokyo (JP); Toshiba Electronic Devices & Storage Corporation, Minato-ku, Tokyo (JP)

(72) Inventor: Yuki Kawamitsu, Yokohama Kanagawa (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 0 days.

(21) Appl. No.: 16/299,653

(22) Filed: Mar. 12, 2019

(65) Prior Publication Data
US 2020/0090696 A1 Mar. 19, 2020

(30) Foreign Application Priority Data
Sep. 18, 2018 (JP) ................. 2018-173876

(51) Int. Cl.
*G11B 20/10* (2006.01)
*G06F 13/42* (2006.01)

(52) U.S. Cl.
CPC .......... *G11B 20/10* (2013.01); *G06F 13/4204* (2013.01); *G06F 13/4282* (2013.01); *G06F 2213/0004* (2013.01); *G06F 2213/0016* (2013.01)

(58) Field of Classification Search
CPC ... G06F 1/26; Y10T 307/406; Y10Y 307/445; Y10Y 307/383; G11B 5/486; G11B 33/122; G11B 33/26; G11B 5/02; G11B 5/035; G11B 20/0013
USPC ........ 360/46, 65, 67, 99.25, 266.3; 713/340; 324/76.39; 331/117 D; 307/31
See application file for complete search history.

(56) References Cited

U.S. PATENT DOCUMENTS

| | | | | |
|---|---|---|---|---|
| 5,912,595 A | * | 6/1999 | Ma | H03L 1/025 331/117 D |
| 6,809,606 B2 | | 10/2004 | Wong et al. | |
| 6,836,848 B2 | | 12/2004 | Yu et al. | |
| 7,836,322 B2 | | 11/2010 | Chapuis et al. | |
| 8,134,356 B2 | * | 3/2012 | Dobberpuhl | G06F 1/3203 324/76.39 |
| 8,868,956 B1 | * | 10/2014 | Kraipak | G06F 1/26 713/340 |
| 2013/0249290 A1 | * | 9/2013 | Buonpane | G06F 1/3209 307/31 |

* cited by examiner

*Primary Examiner* — Nabil Z Hindi
(74) *Attorney, Agent, or Firm* — White & Case LLP

(57) ABSTRACT

According to one embodiment, a magnetic disk device includes a control device and a regulator device. The control device and the regulator device are connected to each other through a first interface and a second interface. The control device transmits a required voltage value to the regulator device through the first interface and transmits a correction value based on the required voltage value and an output voltage output from the regulator device to the regulator device. The regulator device outputs a voltage to the control device on the basis of the received required voltage value and corrects a value of the voltage to be output to the control device on the basis of the received correction value.

6 Claims, 3 Drawing Sheets

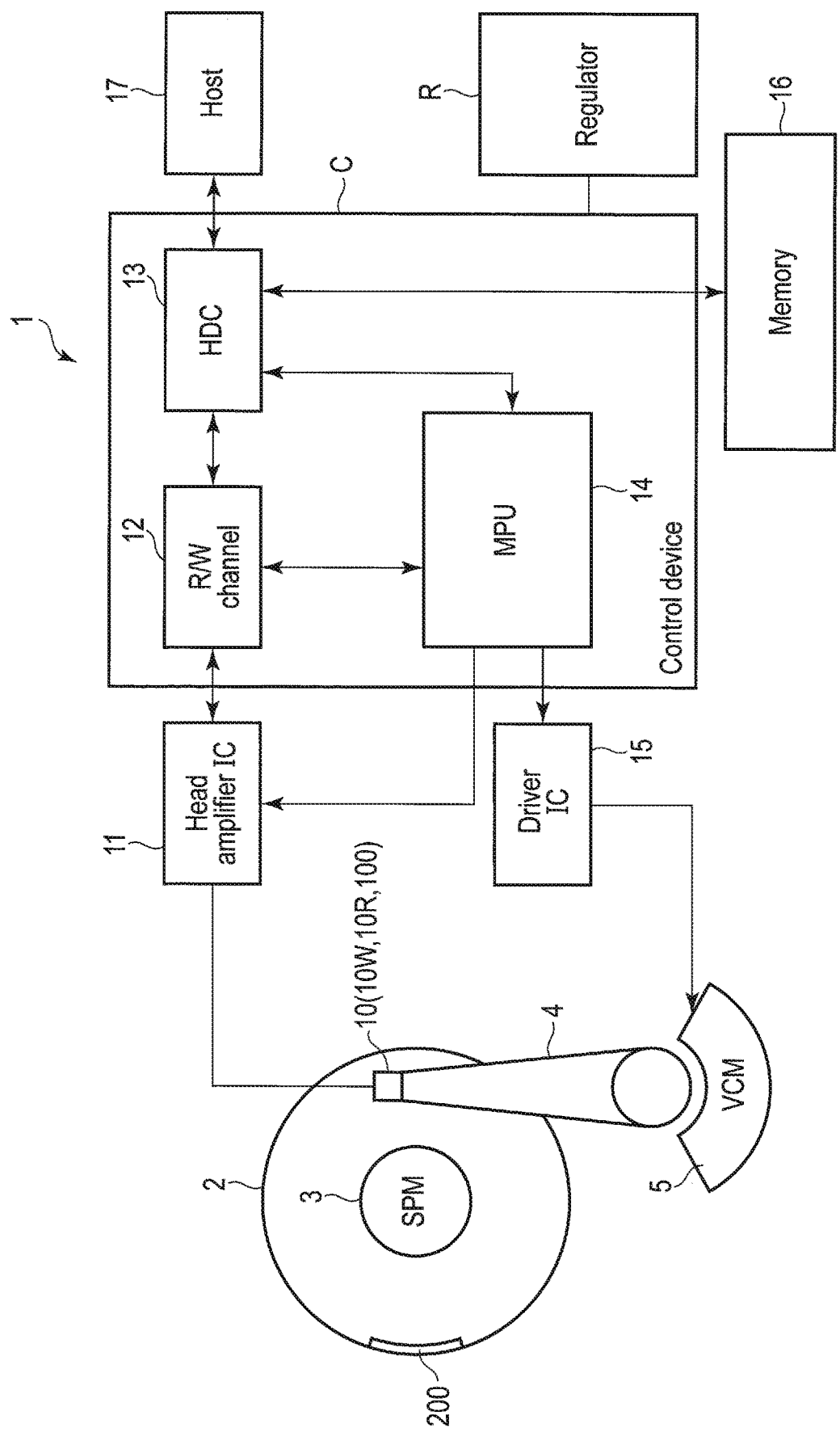
F I G. 1

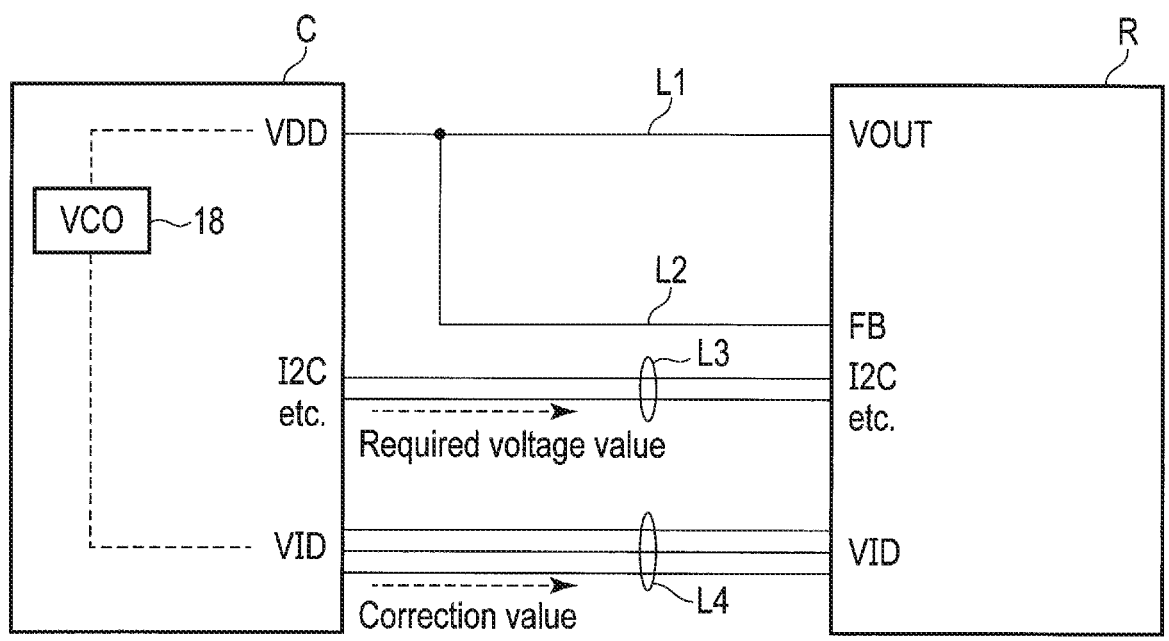
F I G. 2
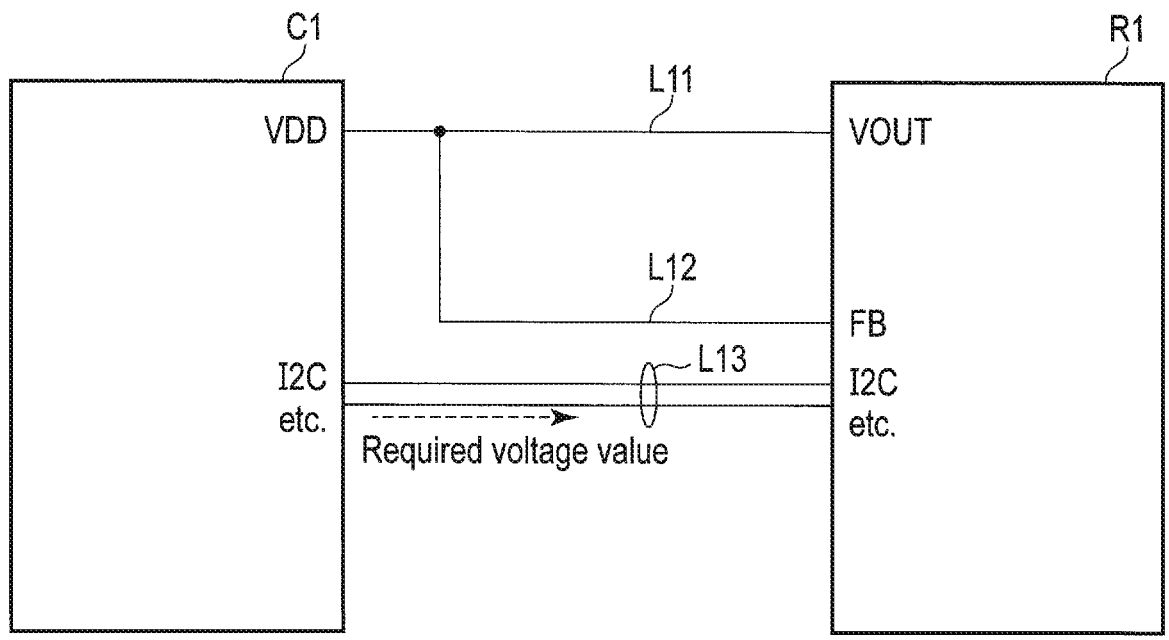
F I G. 4

MAGNETIC DISK DEVICE, CONTROL DEVICE, AND REGULATOR DEVICE

CROSS-REFERENCE TO RELATED APPLICATIONS

This application is based upon and claims the benefit of priority from Japanese Patent Application No. 2018-173876, filed Sep. 18, 2018, the entire contents of which are incorporated herein by reference.

FIELD

Embodiments described herein relate generally to a magnetic disk device, control device, and regulator device.

BACKGROUND

In a magnetic disk device, a control device configured to control read/write of data from/to the magnetic disk is provided. This control device is connected to a regulator device and, electric power is output from the regulator device to the control device, whereby the control device operates. Accordingly, the control device needs to set an output voltage of the regulator device.

Here, a technique for setting a power supply voltage by transmitting a voltage value necessary for the control device to the regulator device through a serial interface such as an I2C or the like is known. However, the regulator device varies in the output voltage accuracy. Further, even if the power supply voltage is constant, the internal circuit of the control device varies in the operating frequency, and hence regarding the voltage output from the regulator device, the variation in the control device also needs to be taken into consideration. Accordingly, the control device has hitherto set the output voltage of the regulator device, i.e., the power supply voltage by taking the output variation of the regulator device into consideration in addition to the operable voltage of the power source regarding which the variation in the operating frequency of the internal circuit is taken into consideration.

Incidentally, when the power supply voltage is to be set as described previously, transmitting a voltage value from the control device to the regulator through a serial interface is conceivable. However, when the serial interface is used, the response speed of the regulator becomes low due to the influence of the communication speed. For this reason, it becomes impossible to carry out voltage correction in real time.

Further, when the power supply voltage is to be set as described previously, transmitting parallel signals formed by uniquely assigning a power supply voltage value to parallel signals from the control device to the regulator through a parallel interface is also conceivable. By doing so, it is possible to make the response speed of the regulator higher than the case of the serial interface. However, when the parallel interface is used, due to uniquely assigning the power supply voltage value to the parallel signals, the voltage variation steps depends on the number of passes. Accordingly, when it is aimed to vary the voltage by way of the parallel interface, the voltage variation steps become coarse, and thus it becomes possible to only roughly and coarsely carry out correction of the output voltage of the regulator.

The problem which the present invention aims to solve is to provide a magnetic disk device, regulator device, and control device capable of correcting the output voltage of the regulator device to the control device in real time with a high degree of accuracy.

BRIEF DESCRIPTION OF THE DRAWINGS

FIG. 1 is a view showing an example of a schematic configuration of a magnetic disk device according to an embodiment.

FIG. 2 is a view showing an example of connection between a control device and regulator according to the embodiment.

FIG. 4 is a view showing an example of connection between a control device and regulator according to another configuration different from the embodiment.

DETAILED DESCRIPTION

Figure 3:
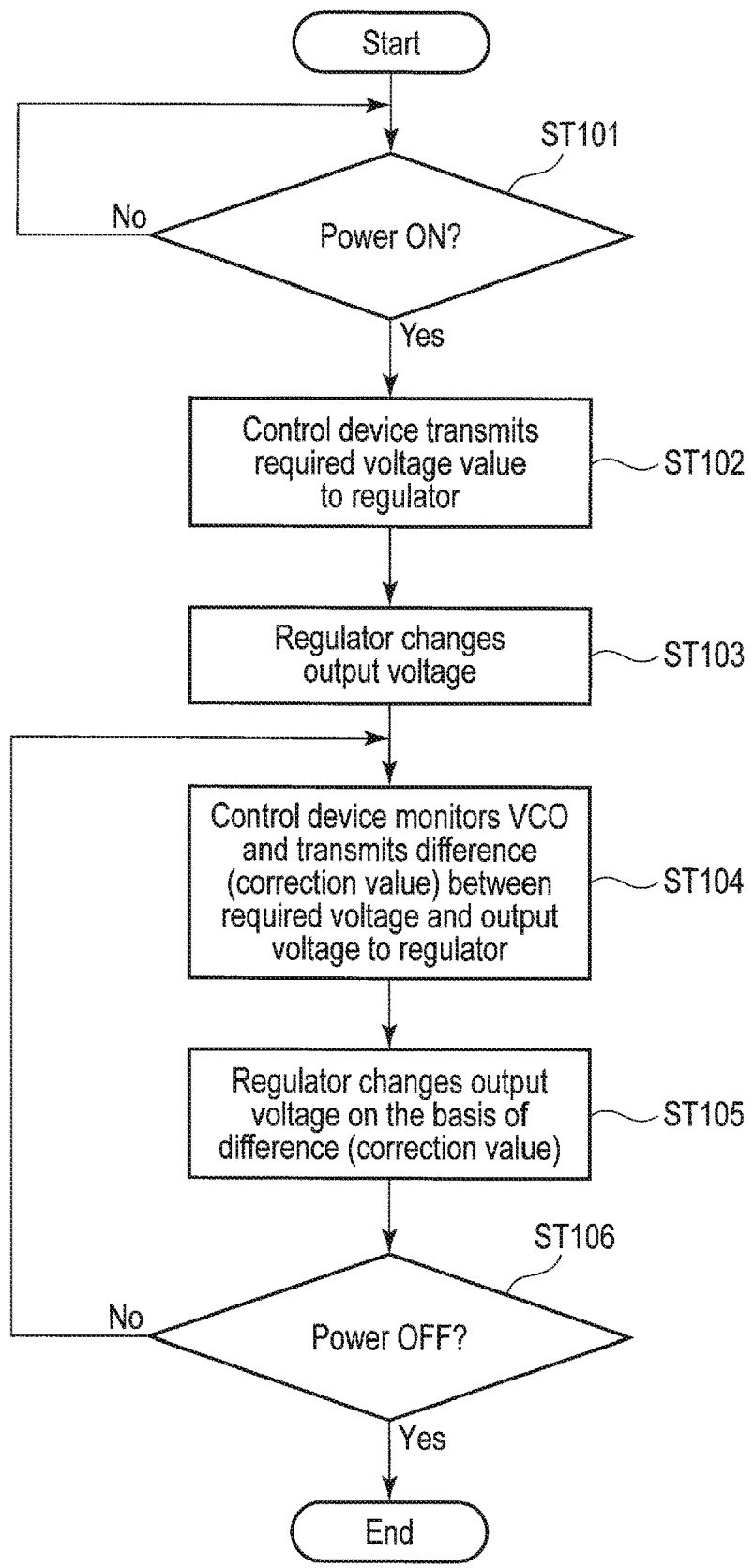
FIG. 3 is a flowchart showing an example of power supply voltage correction processing according to the embodiment.

In general, according to one embodiment, a magnetic disk device includes a control device and a regulator device. The control device configured to control processing relating to a magnetic disk. The regulator device configured to output a voltage to the control device. The control device and the regulator device are connected to each other through a first interface and a second interface. The control device transmits a required voltage value to the regulator device through the first interface and transmits a correction value based on the required voltage value and an output voltage output from the regulator device to the regulator device. The regulator device outputs a voltage to the control device on the basis of the received required voltage value and corrects a value of the voltage to be output to the control device on the basis of the received correction value.

Hereinafter, an embodiment will be described with reference to the accompanying drawings. It should be noted that the disclosure has been presented by way of example only, and the contents described in the following embodiment are not intended to limit the scope of the invention. Modifications readily occur to those skilled in the art are naturally included in the scope of the disclosure. In order to make the description more definite, the size, shape, and the like of each section are schematically expressed in the drawings by changing them from the actual embodiment in some cases. In a plurality of drawings, corresponding elements are denoted by identical reference numbers, and detailed descriptions are omitted in some cases.

FIG. 1 is a block diagram of a magnetic disk device according to a first embodiment.

As shown in FIG. 1, a magnetic disk device 1 is configured as a hard disk drive (HDD), and is provided with a magnetic disk (hereinafter referred to as a "disk") 2, spindle motor (SPOM) 3, actuator 4, voice coil motor (VCM) 5, magnetic head (hereinafter referred to as a "head") 10, head amplifier IC 11, R/W channel 12, hard disk controller (HDC) 13, microprocessor unit (MPU) 14, driver IC 15, memory 16, and regulator R. Further, the magnetic disk device 1 is connectable to a host 17. Although details will be described later, the head 10 is provided with a write head (recording head: writer) 10W, read head (reproducing head: reader) 10R, and Spin-Torque-Oscillator (STO) 100 which is a high-frequency oscillation device. It should be noted that the R/W channel 12, HDC 13, and MPU 14 are incorporated in a one-chip integrated circuit as a control device C. Being configured in this way, the control device C functions as a control device configured to control processing to be carried out with respect to the disk 2.

The disk 2 includes, for example, a substrate formed into a circular disk-like shape and constituted of a non-magnetic material. On each surface of the substrate, a soft magnetic layer constituted of a material exhibiting a soft magnetic property and formed as a foundation layer, magnetic recording layer having magnetic anisotropy in the direction perpendicular to the disk surface and formed as an upper layer of the soft magnetic layer, and protective film layer formed as an upper layer of the magnetic recording layer are stacked one on top of another in the order described. Here, the layers closer to the head 10 in the direction to the head 10 are defined as the upper layers.

The disk 2 is fixed to the spindle motor (SPM) 3, and is rotated by the SPM 3 at a predetermined rotational speed. It should be noted that the number of the disks 2 is not limited to one, and a plurality of disks 2 may be arranged on the SPM 3. The SPM 3 is driven by a drive current (or drive voltage) supplied from the driver IC 15. On and from the disk 2, a data pattern is recorded and reproduced by the head 10. The disk 2 includes a region for monitoring (evaluation region) 200. The monitor region 200 is a dedicated region used to evaluate the oscillation characteristics of the STO 100. The monitor region 200 is provided at a part of, for example, the outermost circumference or innermost circumference of the disk 2 in the radial direction.

The actuator 4 is rotatably provided and, the head 10 is supported on the tip end section of the actuator 4. The actuator 4 is rotated by the voice coil motor (VCM) 5, whereby the head 10 is moved to a position on a desired track of the disk 2 and is positioned there. The VCM 5 is driven by a drive current (or drive voltage) supplied from the driver IC 15.

The head 10 includes a slider 8, and write head 10W and read head 10R which are formed on the slider 8. A plurality of heads 10 are provided according to the number of the disks 2.

The head amplifier IC 11 includes a circuit associated with drive, detection of the oscillation characteristics, and the like of the STO 100. The head amplifier IC 11 executes drive, drive signal detection, and the like of the STO 100. Furthermore, the head amplifier IC 11 supplies a write signal (write current) corresponding to write data to be supplied thereto from the R/W channel 12 to the write head 10W. Further, the head amplifier IC 11 amplifies a read signal output from the read head 10R and transmits the amplified read signal to the R/W channel 12.

The R/W channel 12 is a signal processing circuit configured to process a signal associated with read/write. The R/W channel 12 includes a read channel configured to execute signal processing of read data and write channel configured to execute signal processing of write data. The R/W channel 12 converts a read signal into digital data and decodes read data from digital data. The R/W channel 12 encodes write data transferred thereto from the HDC 13 and transfers the encoded write data to the head amplifier IC 11.

The HDC 13 controls write of data to the disk 2 and read of data from the disk 2 through the head 10, head amplifier IC 11, R/W channel 12, and MPU 14. The HDC 13 constitutes an interface between the magnetic disk device 1 and host 17 and executes transfer control of read data and write data. That is, the HDC 13 functions a host interface controller configured to receive a signal transferred from the host 17 and transfer a signal to the host 17. When transferring a signal to the host 17, the HDC 13 executes error correction processing of data of a reproduced signal read and decoded by the head 10 in accordance with the control of the MPU 14. Further, the HDC 13 receives a command (write command, read command or the like) transferred thereto from the host 17 and transmits the received command to the MPU 14.

The MPU 14 is the main controller of the magnetic disk device 1 and executes control of a read/write operation and servo control necessary for positioning of the head 10.

The driver. IC 15 controls drive of the SPM 3 and VCM 5 in accordance with the control of the MPU 14. By the drive of the VCM 5, the head 10 is positioned at the target track on the disk 2.

The memory 16 includes a volatile memory and nonvolatile memory. For example, the memory 16 includes a buffer memory constituted of a DRAM, and flash memory. The memory 16 stores therein programs and parameters necessary for the processing of the MPU 14.

The regulator R is constituted of, for example, an electronic circuit and carries out control in such a manner as to keep a voltage to be output to the control device C constant.

FIG. 2 is a view showing an example of connection between the control device C and regulator R.

A VDD terminal of the control device C and Vout terminal of the regulator R are connected to each other through a line L1. Further, the VDD terminal of the control device C and an FB terminal of the regulator R are connected to each other through a line L2 branching off from the line L1. Thereby, an output voltage output from the Vout terminal is fed back to the regulator R. Furthermore, the control device C and regulator R are connected to each other through lines L3 and lines L4. The lines L3 are lines to be connected by an I2C (serial interface: first interface), and lines L4 are lines to be connected by a Voltage IDentification (VID) (parallel interface: second interface). That is, each of the control device C and regulator R includes two types of interfaces including a serial interface and parallel interface, and these interfaces are connected to each other. The control device C can transmit a required voltage value to the regulator R through the lines L3 and, furthermore can transmit a correction value (to be described later) to the regulator R through the lines L4.

Further, the control device is provided with a Voltage-Controlled Oscillator (VCO) 18. The VCO 18 is an oscillator configured to control a frequency by a voltage. By monitoring the operating frequency of the VCO 18, the control device C can acquire an operating voltage of the internal circuit of the control device C, in other words, an output voltage of the regulator R. Further, by monitoring the VCO 18, the control device C can acquire a difference between an output voltage and required voltage on the basis of the output voltage from the regulator R to be acquired and required voltage which the control device C requires the regulator R to provide. The control device C transmits the difference to the regulator R through the lines L4 as the above-mentioned correction value.

Next, an example of power supply voltage correction processing to be carried out by the control device C and regulator R configured as shown in FIG. 2 will be described below. FIG. 3 is a flowchart showing an example of power supply voltage correction processing.

As shown in FIG. 3, the control device C first determines whether or not the power is on (ST101). More specifically, the control device C determines whether or not the power (illustration omitted) to the magnetic disk device 1 has been turned on. When it is determined by the control device C that the power has not been turned on (ST101: NO), the processing repeats the determination of step ST101. That is, the standby state is continued.

Upon determination that the power has been turned on (ST101: YES), the control device C transmits a required voltage value to the regulator R (ST102). Upon receipt of the required voltage value from the control device C, the regulator R changes the output voltage to the control device C (ST103).

After completion of the processing of aforementioned step ST101 through ST103, the control device C monitors the VCO 18 and transmits a difference (correction value) between the required voltage and output voltage to the regulator R (ST104). Upon receipt of the difference (correction value) from the control device C through the lines L4, the regulator R corrects the voltage value on the basis of the difference to thereby change (correct) the output voltage to the control device C (ST105).

Next, the control device C determines whether or not the power is off (ST106). When it is determined by the control device C that the power has not been turned off (ST106: NO), the processing returns to step ST104. Accordingly, the processing of the aforementioned steps ST104 and 51105 is repeated until the power is turned off. Accordingly, the voltage output from the regulator R to the control device C is corrected in real time. Further, when it is determined by the control device C that the power has been turned off (ST106: YES), the processing is terminated.

Next, the function of the power supply voltage correction processing according to this embodiment will be described below in comparison with the power supply voltage correction processing according to another configuration. FIG. 4 shows an example of connection between a control device C1 and regulator R1 according to another configuration different from this embodiment.

As shown in FIG. 4, a VDD terminal of the control device C1 and Vout terminal and FB terminal of the regulator R1 are connected to each other through lines L11 and L12, this being identical to the case of FIG. 2. Furthermore, the control device C1 and regulator R1 are connected to each other by way of the I2C (serial interface) through lines L13, this being also identical to the case of FIG. 2. Due to such a configuration, when correcting the output voltage of the regulator R1, the control device C1 transmits a required voltage value to the regulator R1 through the lines L13 to thereby carry out correction of the output voltage (i.e., power supply voltage) of the regulator R1. However, with the configuration shown in FIG. 4, when the output voltage of the regulator R1 varies in accuracy, a need to take the variation into consideration arises. Further, the interface I2C is used, and hence the response speed of the regulator R1 becomes lower.

Conversely, with the configuration of this embodiment shown in FIG. 2, each of the control device C and regulator R is provided with two types of interfaces including the serial interface and parallel interface. Further, the difference (correction value) between the required voltage and output voltage from the regulator can be transmitted to the regulator through the lines L4 in real time in addition to transmitting the required voltage value from the control device C to the regulator through the lines L3 in real time. Accordingly, it is possible for the regulator R to correct the voltage value in real time on the basis of the difference and change the output voltage to the control device C. Therefore, in the magnetic disk device 1, there is no need to provide a margin regarding which the variation in the operating frequency inside the control device and variation in the output voltage of the regulator are taken into consideration, the response speed becomes higher, and correction of the output voltage of the regulator R can be carried out in real time with a high degree of accuracy. As described above, correction of the output voltage of the regulator R can be carried out in real time with a high degree of accuracy, and hence it is also possible to contribute to realization of power savings of the power consumption of the magnetic disk device 1.

It should be noted that in the embodiment described above, although the case where the serial interface is the I2C, and parallel interface is the VID has been described, the serial interface and parallel interface are not limited to these, and other serial interfaces and parallel interfaces may also be used.

Further, in the embodiment described above, the control device C does not interfere with the FE terminal of the regulator R for the purpose of carrying out correction of the power supply voltage, and hence it is possible to correct the IR drop and variation in the output voltage inside the control device C while resolving the instability in correction.

Furthermore, it is desirable that the width of the difference (correction value) to be transmitted from the control device C to the regulator R be limited to a small variation. By virtue of such a configuration, it becomes possible to reduce the number of passes of the VID.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a control device configured to control processing relating to a magnetic disk; and
a regulator device configured to output a voltage to the control device,
wherein
the control device and the regulator device are connected to each other through a first interface and a second interface,
the control device transmits a required voltage value to the regulator device through the first interface and transmits a correction value to the regulator device through the second interface,
the regulator device outputs a voltage to the control device on the basis of the received required voltage value and corrects a value of the voltage to be output to the control device on the basis of the received correction value, and
the correction value is generated by the control device and is based on the required voltage value and an output voltage output from the regulator device.

2. The magnetic disk device of claim 1, wherein the first interface is a serial interface and the second interface is a parallel interface.

3. The magnetic disk device of claim 1, wherein the correction value is a difference between the required voltage value and the output voltage.

4. The magnetic disk device of claim 1, wherein the control device further includes an oscillator configured to control a frequency by a voltage, and the control device monitors an operating frequency of the oscillator to thereby acquire the output voltage.

5. A control device used for a magnetic disk device and configured to control processing relating to a magnetic disk comprising:
a first interface for connection to a regulator device; and
a second interface for connection to the regulator device, wherein
the control device transmits a required voltage value to the regulator device through the first interface and transmits a correction value to the regulator device through the second interface, the correction value is generated by the control device and is based on the required voltage value and an output voltage output from the regulator device.

6. A regulator device used for a magnetic disk device comprising:
a first interface for connection to a control device configured to control processing relating to a magnetic disk; and
a second interface for connection to the control device, wherein
the regulator device receives a required voltage value from the control device through the first interface, outputs a voltage to the control device on the basis of the received required voltage value, receives a correction value based on the required voltage value and the output voltage output from the regulator device through the second interface, and corrects a value of the voltage to be output to the control device on the basis of the received correction value.

* * * * *